Patented Mar. 21, 1933

1,902,419

UNITED STATES PATENT OFFICE

ROY A. PLANT AND MANLEY E. BROOKS, OF MIDLAND, MICHIGAN, ASSIGNORS TO THE DOW CHEMICAL COMPANY, OF MIDLAND, MICHIGAN, A CORPORATION OF MICHIGAN

MOLDING COMPOSITION AND METHOD OF TREATING

No Drawing.  Application filed July 30, 1931. Serial No. 554,154.

The present invention relates to the treatment of molding compositions and specifically to the treatment of such compositions to reduce or eliminate to a large extent loss of moisture from the composition prior to the pouring of a casting into a mold formed therefrom. It is well known that molding compositions, such as water moistened green sand, tend to dry out fairly rapidly. In order to keep such compositions in proper temper for use, the common procedure is to moisten the surface of the heap of molding sand, cover it with a wet canvas, or else moisten and rework the sand at relatively frequent intervals. Of recent years synthetic molding compositions utilizing bentonite, Georgia white clay, or the like, as a plasticizer, have been coming more and more into common use. These synthetic compositions likewise present the same drying out problem as is encountered with natural compositions, although ordinarily to a slightly lesser degree which is possibly due to efficient mixing and the use of plasticizers which retain moisture slightly better than those in natural compositions. The drying out difficulty is not only encountered in keeping the composition in proper temper for molding but is also present after the mold is made up since, if the mold is left open, the surface dries out, especially the sharp edges, leaving the surface in a condition susceptible to washing when the metal is poured in contact therewith. We have now found that the addition of certain hygroscopic materials to the molding composition, either natural or synthetic, either eliminates or greatly reduces the drying out tendency that has heretofore been considered a necessary evil by those familiar with the art.

To the accomplishment of the foregoing and related ends, the invention, then, consists of the method, steps and product hereinafter fully described and particularly pointed out in the claims, the following description setting forth in detail several forms of product and modes of carrying out the invention, such disclosed forms and modes illustrating, however, but several of the various ways in which the principle of the invention may be used.

In the working up of the molding composition according to our invention, the hygroscopic salt may be added directly thereto or dissolved in water or the like and then added to the molding sand, the whole having sufficient water admixed thereto to temper it to the proper molding consistency. This composition after tempering, where the proper amount of hygroscopic salt has been used, needs little or no protection from air and will remain in temper for a long period of time. Moreover, this composition can be readily molded and such molds will resist drying out before use to a remarkable extent.

The materials that we have found best suited for the elimination or reduction of loss of moisture from the molding composition are hygroscopic halogen salts of which calcium bromide, magnesium bromide, lithium bromide, lithium chloride, $CaCl_2.2MgCl_2.12H_2O$, magnesium chloride and calcium chloride or mixtures of them are noted. The latter three, which are of a deliquescent nature, we have found to be highly satisfactory for most purposes. Natural brines such as bitter water which is commonly known as a solution of calcium, magnesium, and sodium chlorides, can in general be used in equivalent manner to the salts above noted, limiting factors being the strength of the solution in desired hygroscopic halogen salts and the amount of water required by the composition. These materials may be added with a desirable effect to the molding composition in amount (halogen salt basis) ranging from 1 to 10 per cent of the composition, although for most purposes approximately 4 per cent gives satisfactory results. Where either a natural molding composition, or a synthetic composition consisting of a mixture of sharp or bank sand with 2 to 10 per cent of bentonite or its equivalent as a plasticizer, is used for molding, we prefer to add approximately 4 per cent of calcium chloride to the composition to overcome its drying out tendency. Such composition, after initial tempering and mixing, preferably in a Muller type of apparatus, will retain its temper for relatively long periods of time with little or no further attention.

Recently considerable work has been done with a synthetic carbon base molding composition for use in casting readily oxidizable materials, such as magnesium and its alloys. This composition, which consists specifically of a mixture of pulverized carbon 86 per cent, bentonite 3 per cent, oxidation inhibitor (boric acid, sulphur, or ammonium compounds including ammonium chloride or ammonium sulphate) 4 per cent, water 7 per cent, tends to dry out very rapidly. The treatment of this composition with approximately 4 per cent calcium chloride, we have found substantially overcomes the drying out tendencies of this composition and, moreover, does not act in a detrimental manner to accelerate oxidation of the readily oxidizable metal cast. The use of our improved procedure in connection with synthetic molding compositions, such as those made from sand or carbon, further appears to have a marked effect in reducing the amount of plasticizing agent, such as bentonite, necessary to give the molding composition sufficient bond to mold properly.

The term "molding composition" as used in the claims is to be understood to cover both natural molding compositions and synthetic compositions. In like manner, the term "finely divided base material" is to be considered to cover sand, pulverized carbon, pulverized cinders, etc., usable as the base material in a molding composition.

Other modes of applying the principle of our invention may be employed instead of those explained, change being made as regards the method and product herein disclosed, provided the method and product stated in any of the following claims or the equivalent thereof be employed.

We therefore particularly point out and distinctly claim as our invention:—

1. In a method of treating a molding composition to prevent excessive loss of moisture, the step which consists in incorporating in such composition a hygroscopic, fluorine free, halide salt.

2. In a method of treating a molding composition to prevent excessive loss of moisture, the step which consists in incorporating in such composition 1 to 10 per cent of hygroscopic, fluorine free, halide salt.

3. In a method of treating a molding composition to prevent excessive loss of moisture, the step which consists in incorporating in such composition 1 to 10 per cent of deliquescent, fluorine free, halide salt.

4. In a method of treating a molding composition to prevent excessive loss of moisture, the step which consists in incorporating in such composition 1 to 10 per cent of a deliquescent chloride.

5. In a method of treating a molding composition to prevent excessive loss of moisture, the step which consists in incorporating in such composition 1 to 10 per cent of calcium chloride.

6. In a method of treating a molding composition to prevent excessive loss of moisture, the step which consists in incorporating in such composition approximately 4 per cent of calcium chloride.

7. A molding composition comprising a finely divided base material, a plasticizer, 1 to 10 per cent of hygroscopic, fluorine free, halide salt, and sufficient water to moisten the mixture and render same moldable.

8. A molding composition comprising pulverized hard carbon, a plasticizer, and 1 to 10 per cent of hygroscopic halogen salt, the whole being moistened with sufficient water to render same moldable.

9. A molding composition consisting of pulverized hard carbon, bentonite, and 4 per cent of calcium chloride, the whole being moistened with sufficient water to render same moldable.

10. A molding composition comprising sand, a plasticizer, and 1 to 10 per cent of hygroscopic, fluorine free, halide salt, the whole being moistened with sufficient water to render same moldable.

11. A molding composition consisting of bank sand, bentonite 2 to 10 per cent, calcium chloride 1 to 10 per cent, and sufficient water to render the mixture moldable.

12. In a method of treating a molding composition to prevent excessive loss of moisture, the step which consists in incorporating in such composition at least one of the halide salts calcium bromide, magnesium bromide, lithium bromide, lithium chloride, magnesium chloride, calcium chloride, double chloride of calcium and magnesium.

13. A mold composition comprising a finely divided base material, a plasticizer, 1 to 10 per cent of at least one of the halide salts calcium bromide, magnesium bromide, lithium bromide, lithium chloride, magnesium chloride, calcium chloride, double chloride of calcium and magnesium, and sufficient water to moisten the mixture and render same moldable.

Signed by us this 28th day of July, 1931.

ROY A. PLANT.
MANLEY E. BROOKS.